United States Patent [19]
Butler et al.

[11] Patent Number: 5,220,801
[45] Date of Patent: Jun. 22, 1993

[54] METHOD AND APPARATUS FOR MAINTENANCE OF SLUSH MIXTURE AT DESIRED LEVEL DURING MELT CONDITIONS

[75] Inventors: David A. Butler, Macungie; Robert B. Moore, Allentown, both of Pa.

[73] Assignee: Air Products and Chemicals, Inc., Allentown, Pa.

[21] Appl. No.: 871,258

[22] Filed: Apr. 20, 1992

[51] Int. Cl.⁵ .............................................. F17C 5/00
[52] U.S. Cl. .................................... 62/54.1; 62/7
[58] Field of Search .................... 62/7, 50.1, 54.1

[56] References Cited

U.S. PATENT DOCUMENTS

| | | | |
|---|---|---|---|
| 2,257,897 | 10/1941 | Zenner et al. | 62/50.1 |
| 3,473,343 | 10/1969 | Chamberlain | 62/7 |
| 3,810,365 | 5/1974 | Hampton et al. | 62/54.1 |
| 4,224,801 | 9/1980 | Tyree, Jr. | 62/54.1 |
| 4,300,355 | 11/1981 | McWhorter et al. | 62/48 |

OTHER PUBLICATIONS

"Slush Hydrogen Production for the National Aero-Space Plane Programs" by Robert B. Moore, et al. at the World Hydrogen Energy Conference #8, 22-27 Jul. 1990 in Hawaii.

*Primary Examiner*—Ronald C. Capossela
*Attorney, Agent, or Firm*—Thomas G. Ryder; James C. Simmons; William F. Marsh

[57] ABSTRACT

A method and apparatus for maintaining a liquid-frozen solid slush mixture in a vessel at a desired total slush mixture and desired solids content during conditions under which the solids in the slush mixture in the vessel are melting. The method comprises introducing fresh slush mixture to the vessel, while removing liquid from the vessel—both at rates directly proportional to the rate of solids melting in the vessel. The apparatus comprises an auxiliary vessel containing slush mixture and means for transferring slush mixture to the main vessel at one rate, means for transferring liquid from the main vessel to the auxiliary vessel at another rate, and means for controlling the transfer rates in a prescribed manner.

16 Claims, 1 Drawing Sheet

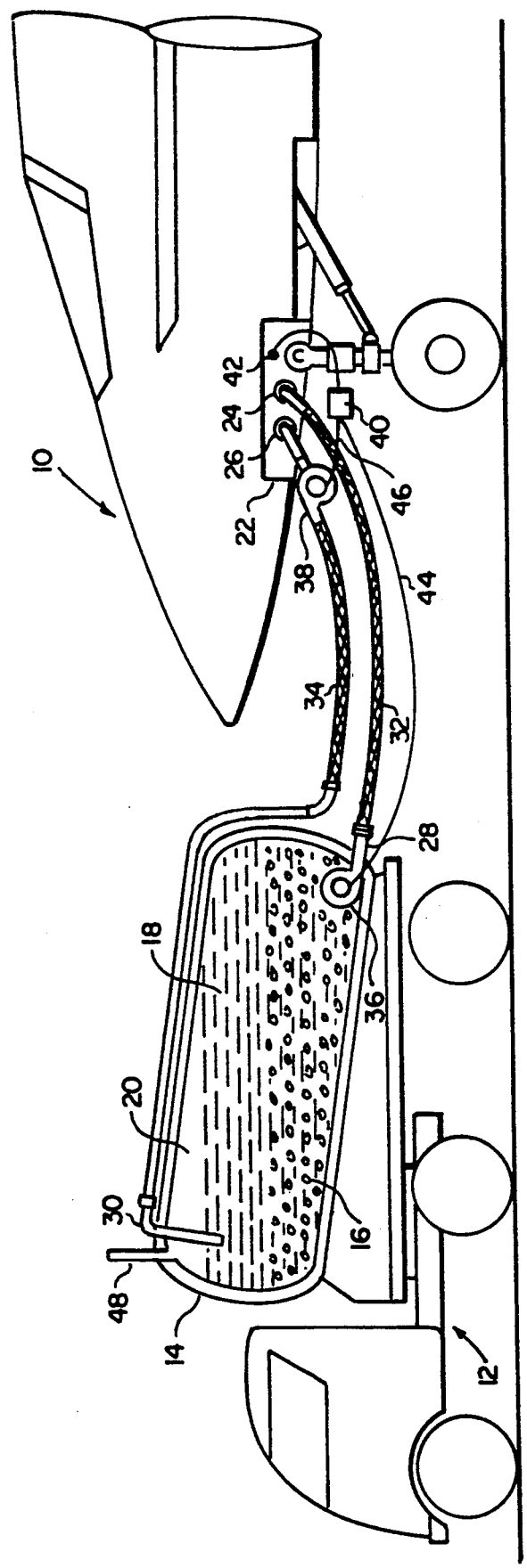

METHOD AND APPARATUS FOR MAINTENANCE OF SLUSH MIXTURE AT DESIRED LEVEL DURING MELT CONDITIONS

FIELD OF THE INVENTION

This invention relates to a method and apparatus for maintaining a frozen "slush" mixture at a predetermined quantity in a vessel during a period of time when the solid components of the slush mixture are melting. More particularly this invention relates to a method and apparatus for replenishing melted solids in a slush mixture in a vessel, while maintaining the volume of the slush mixture in the vessel at a predetermined level.

BACKGROUND OF THE INVENTION

There are a variety of different technologies which employ one kind or another of a type of liquid-solid mixture termed a "slush". Generally, a slush is a liquid-solid mixture in which the solid is the frozen form of at least a portion of the liquid part of the mixture. The liquid is a continuous phase, while the solid is a discontinuous phase composed of a multitude of discrete particles, and the mixture is flowable and/or pumpable. Slushes and the means of producing them are well known in the art. Illustrative of slushes, the particular techniques for making them and their uses or employments are U.S. Pat. No. 4,300,355, which describes a water-ice slush and a use therefor, and the paper entitled "Slush Hydrogen Production for the National Aero-Space Plane Programs" by Robert B. Moore, Glenn E. Kinard and David Nahmias presented at the World Hydrogen Energy Conference #8, 22-27 July 1990, in Hawaii, which describes a liquid-solid hydrogen slush and a use therefor. The techniques for making slushes all require the use of "low" temperatures—some at about the freezing point of water and others requiring temperatures in the cryogenic range. As will be readily understood, the use of any such slush for its intended purpose immediately after its preparation is rather straightforward. A problem arises, however, when the slush can not or is not used immediately and the nature of the problem is exacerbated by the differential between the temperature of the slush and ambient temperature. In the case of the ice-water slush described in U.S. Pat. No. 4,300,355, it is quite common for the differential between the slush and ambient temperatures to range from 50° to 70° F. during the summer months in the United States. Thus, for example, if the slush of the U.S. Patent is not employed immediately, there will be a gradual melting of the ice and loss of the greater cooling capacity of the slush, along with concomitant reduction in the advantages of this particular slush employment.

When the slush hydrogen of the Moore et al. paper is considered, it will be seen that the temperature differential between slush and ambient is generally in the range of about 500° F. In this case, the nature of the application precludes a high degree of insulation and the rate of melting of the solid in the slush will be extremely rapid when the slush is not used immediately.

For hypersonic and space plane applications, a probable fueling procedure requires that the vehicle be fueled with slush hydrogen at a fixed fueling station, after which the vehicle will be towed to the end of a runway—a trip lasting 30 minutes or more. Because of weight and space limitations in a practical flight vehicle, thermal insulation of the fuel tank is inadequate to prevent substantial melting of the solid component of the slush hydrogen before the vehicle becomes fully operative.

It has been suggested that a portable "reslushifier" be towed along with such a vehicle in order to keep the vehicle fuel tanks at design conditions. This is not seen as being feasible, since the slush replenishment rate is on the order of 100 times greater than the production rate for the fixed ground support system slush generators.

Simply adding extra slush hydrogen to the fuel tank and permitting the solids in the slush to melt is also not a satisfactory solution, since this would require designing oversized fuel tanks with excessive initial ullage to allow space for expansion of the fuel as the solids melt, and would diminish the ability to utilize the fuel as a coolant to the degree desired during take off and flight.

SUMMARY OF THE INVENTION

The method of this invention is effective to maintain the solids content and the total quantity (weight and volume) of a slush mixture in a primary vessel at predetermined values during a period of time when the solids of the slush mixture in the primary vessel are melting. The method comprises filling the primary vessel with the slush mixture to a predetermined volumetric capacity of the primary vessel. A separate auxiliary vessel is provided which contains a quantity of slush mixture. Slush mixture is transferred from the auxiliary vessel to the primary vessel at a rate that will infuse solid particles into the primary vessel at a rate that is comparable to the rate at which the solid melts in the primary vessel. Liquid is also transferred from the primary vessel to the auxiliary vessel at a rate which is directly proportional to the rate at which the solid melts in the primary vessel. Through this method the weight of the slush mixture in the primary vessel is maintained at the predetermined value. This method is particularly valuable when the predetermined quantity of the slush mixture in the primary vessel is substantially the volumetric capacity of the primary vessel.

Preferably, the auxiliary vessel has upper and lower regions. In which case the method of this invention advantageously transfers the slush mixture from the lower region of the auxiliary vessel to the primary vessel and the liquid is transferred from the primary vessel to the upper region of the auxiliary vessel.

When specifically applied to the case of fueling a vehicle powered by slush hydrogen fuel, the fuel tank of the vehicle is initially filled substantially to its volumetric capacity with slush hydrogen, such as at a fixed location fueling station. After ground system disconnect and discontinuance of fueling and before operation of the vehicle, the solids in the slush hydrogen in the fuel tank melt. In this specific application, the auxiliary tank is loaded with slush hydrogen to a level less than its full volumetric capacity. Slush hydrogen is transferred from the auxiliary tank to the fuel tank at a rate that introduces solid hydrogen particles at a rate comparable to the rate of solids melting in the fuel tank. Liquid hydrogen is also removed from the fuel tank and transferred to the auxiliary tank at a rate directly proportional to the rate of solids melting in the fuel tank. Preferably, the rate of transfer of liquid hydrogen to the auxiliary tank is comparable to the rate of transfer of slush hydrogen to the fuel tank plus the volumetric increase of slush hydrogen in the fuel tank due to melting of solid hydrogen in the fuel tank. Through this method the weight of slush hydrogen in the fuel tank is maintained at the predetermined level, while maintaining the volume of the slush hydrogen at substantially the predetermined value, i.e., the capacity of the fuel tank.

Again, it is preferred that the auxiliary tank have upper and lower regions and that the slush hydrogen be transferred from the lower region of the auxiliary tank and that liquid hydrogen be transferred to the upper region of the auxiliary tank.

The apparatus of this invention comprises a primary vessel for containing a slush mixture and a separate auxiliary vessel also for containing a slush mixture and which has an upper region and a lower region. Preferably, the auxiliary vessel is a highly thermally insulated vessel in order substantially to eliminate melting of solids in the auxiliary vessel. The apparatus also comprises means associated with the auxiliary vessel and in fluid communication with the lower region thereof and adapted for the transfer of slush mixture from the auxiliary vessel to the primary vessel, as well as means associated with the auxiliary vessel and in fluid communication with the upper region thereof and adapted for the transfer of liquid from the primary vessel to the auxiliary vessel. Both of these transfer means are designed to effect their respective transfer functions at controlled rates.

The apparatus of this invention can also comprise means for determining the rate of melt of the solid in the primary vessel and means for controlling the rate of transfer of slush mixture from the auxiliary vessel to the primary vessel in direct proportion to the rate of melt of the solid in the primary vessel along with means for controlling the rate of transfer of liquid to the auxiliary vessel at a rate directly proportional to the rate of solids melt in the primary vessel.

In a preferred embodiment of the apparatus of this invention, the lower region of the auxiliary vessel has an inclined bottom, or bottom wall, which functions to urge further the more dense solid particles of the slush mixture to the lowest portion of the lower region. The means for transferring slush mixture from the auxiliary vessel to the primary vessel is also in communication with this lowest portion of the auxiliary vessel. This functions to insure that the slush mixture transferred from the auxiliary vessel will contain an enhanced concentration of solids.

While various means and techniques are available for determining the rate of solids melt in a vessel, at times they tend to become somewhat complicated and complex. In an effort to simplify such determination, it has been discovered that the rate of change of volume of the slush mixture in the primary vessel is, in the absence of addition to or removal of slush, directly related to the rate of solids melt in the primary vessel. Thus, both the rate of transfer of the slush mixture to the primary vessel and the rate of transfer of liquid to the auxiliary vessel can be controlled at rates directly proportional to the rate of change of volume of the slush mixture in the primary vessel. This results in maintaining the proportionality to the rate of solids melt.

To rephrase this in relation to the particular embodiments of the apparatus of this invention relating to a slush hydrogen fueled vehicle, means are provided for determining the rate of volume increase of slush hydrogen in the fuel tank, while there are also provided means for controlling the rate of transfer of slush hydrogen from the auxiliary tank to the fuel tank directly proportional to the rate of volume increase of slush hydrogen in the fuel tank and means for controlling the rate of transfer of liquid hydrogen from the fuel tank to the auxiliary tank directly proportional to the rate of volume increase of slush hydrogen in the fuel tank. The particular proportionality factors to be employed will vary from one type of slush mixture to another, but those skilled in the art will not have difficulty in determining the ones they might prefer to use after reading this disclosure.

As a general rule, when dealing with a slush hydrogen fueled vehicle, the factors are as follows. The rate of transfer of liquid hydrogen from the fuel tank to the auxiliary tank is about equal to the rate of volume increase of slush hydrogen in the fuel tank, while the rate of transfer of slush hydrogen from the auxiliary tank to the fuel tank is from about 0.85 to about 0.90 times the rate of volume increase of slush hydrogen in the fuel tank.

DESCRIPTION OF THE DRAWING

The FIGURE is representation of an embodiment of this invention used in connection with a slush hydrogen fueled aircraft.

DETAILED DESCRIPTION OF THE INVENTION

Referring now to the FIGURE, there is illustrated a particular utilization of the process of this invention and a there can be seen a particular embodiment of the apparatus of this invention used in connection with a slush hydrogen fueled aircraft.

A slush hydrogen fueled aircraft 10 and a moveable support vehicle 12 are shown. Mounted on support vehicle 12 is a double walled dewar flask 14 disposed in an inclined position. Contained within dewar 14 there is shown a lowermost layer comprised of slush hydrogen 16, an intermediate layer of liquid hydrogen 18, and an uppermost layer of gaseous hydrogen 20.

On aircraft 10, there is illustrated a fuel tank 22 having a slush hydrogen inlet port 24 and a liquid hydrogen outlet port 26. The dewar 14 is shown as having a slush hydrogen outlet port 28 located at the lowermost point of dewar 14 and a liquid hydrogen inlet port 30 located at a point on dewar 14 remote from port 28. It will be noted that liquid hydrogen inlet port 30 extends downwardly through the gaseous hydrogen layer 20 at the uppermost portion of dewar 14 and into liquid hydrogen layer 18.

Providing fluid communication between the lower slush hydrogen layer 16 in dewar 14 via slush hydrogen outlet port 28 and fuel tank 22 via slush hydrogen inlet port 24 is insulated slush hydrogen transfer line 32. Also shown is insulated liquid hydrogen transfer line 34, which provides fluid communication between fuel tank 22 via liquid hydrogen outlet port 26 and the liquid hydrogen layer 18 in dewar 14 via liquid hydrogen inlet port 30. Associated with slush hydrogen transfer line 32 is pump 36 for pumping hydrogen slush 16 through line 32 into fuel tank 22. Similarly, there is associated with liquid hydrogen transfer line 34 pump 38 for pumping liquid hydrogen 18 from fuel tank 22 through line 34 into dewar 14. Pump 38 is illustrated as being disposed external of aircraft 10, but, it will be understood, pump 38 can also be internal to aircraft 10.

There is also shown in the FIGURE a control mechanism 40, such as a microprocessor, having a sensing probe 42 capable of sensing the rate of change of the volume of the slush hydrogen in the fuel tank 22. Control mechanism 40 is capable of generating control signals proportional to the sensed rate of change of the volume of the slush hydrogen in fuel tank 22. Control mechanism 40 also has control signal distributing lines 44 and 46 associated, respectively, with pumps 36 and 38 capable of controlling the rate of pumping of each of the pumps 36 and 38 proportional to the rate of change of the volume of the slush hydrogen in tank 22.

A gaseous hydrogen vent 48 is shown at the uppermost portion of dewar 14 and communicating with the gaseous hydrogen layer 20 in dewar 14. Vent 48 functions to permit any hydrogen which may be generated in dewar 14 to escape from the system and prevents any buildup of pressure in dewar 14 as the ullage space decreases as a result of pumping liquid hydrogen into dewar 14 at a greater rate than slush hydrogen 16 is pumped out of dewar 14.

In practice the system illustrated in the FIGURE operates by filling fuel tank 22 of aircraft 10 substantially to its volumetric capacity with slush hydrogen of desired solids content by means of a fixed fueling station. Dewar 14 is similarly filled to approximately 80% of its volumetric capacity with slush hydrogen 16 having similar or greater solids content. Fueling of aircraft 10 is discontinued and is disconnected from the fixed fueling station. At this time moveable support vehicle 12 is employed and slush hydrogen transfer line 32 is placed in fluid communication with fuel tank 22 by means of slush hydrogen inlet port 24 and liquid hydrogen transfer line 34 is placed in fluid communication with fuel tank 22 by means of liquid hydrogen outlet port 26.

Next, sensing probe 42 is operably located in fuel tank 22 to sense the rate of change of the volume of the slush hydrogen in fuel tank 22. Control lines 44 and 46 are operably connected to pumps 36 and 38, respectively.

Operation is commenced with slush hydrogen 16 being transferred to fuel tank 22 by means of transfer line 32 and liquid hydrogen being transferred from fuel tank 22 to dewar 14 by means of transfer line 34. As sensing probe 42 detects the rate of change of the volume of hydrogen slush in fuel tank 22, signals are generated in control mechanism 40 and sent to pumps 36 and 38 by means of control lines 44 and 46, respectively. In this manner the desired inventory of slush hydrogen with desired solids content is maintained in fuel tank 22.

We claim:

1. A method for maintaining the solids content and total quantity of a slush mixture in a primary vessel at predetermined values during a period of time when the solids of the slush mixture in the primary vessel are melting, which method comprises filling the primary vessel with the slush mixture substantially to a predetermined volumetric capacity of the primary vessel, providing a separate auxiliary vessel containing a quantity of slush mixture, transferring slush mixture from the auxiliary vessel to the primary vessel at a rate that will infuse solid particles into the primary vessel at a rate that is comparable to the rate at which the solid melts in the primary vessel, and transferring liquid from the primary vessel to the auxiliary vessel at a rate directly proportional to the rate at which the solid melts in the primary vessel; whereby the weight of slush mixture in the primary vessel is maintained at the predetermined value and the volume of the slush mixture in the primary vessel is maintained at the predetermined volumetric value.

2. The method of claim 1 wherein the auxiliary vessel has upper and lower regions and wherein the slush mixture is transferred from the lower region of the auxiliary vessel and liquid is transferred to the upper region of the auxiliary vessel.

3. The method of claim 1 wherein the predetermined volumetric value of the primary vessel is substantially the capacity thereof.

4. The method of claim 1 wherein the quantity of slush mixture in the auxiliary vessel is substantially less than the full volumetric capacity of the auxiliary vessel.

5. An apparatus for maintaining a slush mixture at a predetermined quantity in a primary vessel during a period of time when the solid portion of the slush mixture in the primary vessel is melting, which apparatus comprises a separate auxiliary vessel having an upper region and a lower region, means associated with the auxiliary tank and in fluid communication with the lower region thereof for transferring slush mixture from the auxiliary vessel to the primary vessel at a controlled rate, means associated with the auxiliary vessel and in fluid communication with the upper region thereof for transferring liquid from the primary vessel to the auxiliary vessel at a controlled rate.

6. The apparatus of claim 5 in which the auxiliary vessel is a highly thermally insulated vessel.

7. The apparatus of claim 5 having means for determining the rate of melt of the solid in the primary vessel and means for controlling the rate of transfer of slush mixture from the auxiliary vessel directly proportional to the rate of melt of solids in the primary vessel and means for controlling the rate of transfer of liquid to the auxiliary vessel directly proportional to the rate of solids melt in the primary vessel.

8. The apparatus of claim 5 wherein the auxiliary vessel is a dewar having its lower region at least partially defined by an inclined bottom wall designed to urge solid components of the slush mixture to the lowest portion of the lower region thereof and wherein the means for transferring slush mixture from the auxiliary vessel is in communication with such lowest portion and the means for transferring liquid to the auxiliary vessel is in communication with the upper region thereof at a point remote from the lowest portion of the lower region thereof.

9. A method for maintaining the solids content and quantity of fuel in a fuel tank of a slush hydrogen fueled vehicle at predetermined values during the period between the discontinuance of fueling from a fixed location station and fuel operation of the vehicle and during which period the solids in the fuel tank are melting, which method comprises loading the fuel tank to the predetermined quantity and solids content values, providing a separate slush hydrogen auxiliary tank, loading the auxiliary tank with slush hydrogen to a level less than the full volumetric capacity of the auxiliary tank, transferring slush hydrogen from the auxiliary tank to the fuel tank at a rate that will introduce solid hydrogen particles at a rate directly proportional comparable to the rate of solids melting in the fuel tank, transferring liquid hydrogen from the fuel tank to the auxiliary tank at a rate comparable to the rate of slush transfer from the auxiliary tank to the fuel tank plus the volumetric increase of slush in the fuel tank due to melting of solid hydrogen in the fuel tank, whereby the weight of slush hydrogen in the fuel tank is maintained at the predetermined level while maintaining the volume of the slush hydrogen at substantially the predetermined value.

10. The method of claim 9 wherein the auxiliary tank has upper and lower regions and wherein the slush hydrogen is transferred from the lower region of the auxiliary tank and liquid hydrogen is transferred to the upper region of the auxiliary tank.

11. An apparatus for maintaining the solids content and quantity of fuel in a fuel tank of a slush hydrogen fueled vehicle at predetermined values during the period between the discontinuance of fueling from a fixed location station and full operation of the vehicle, which apparatus comprises a separate slush hydrogen auxiliary tank having an upper region and a lower region, means associated with the auxiliary tank and in fluid communication with the lower region thereof for transferring slush hydrogen from the auxiliary tank to the fuel tank at a predetermined rate, means associated with the auxiliary tank and in fluid communication with the upper region thereof for transferring liquid hydrogen from the fuel tank to the auxiliary tank at a predetermined rate.

12. The apparatus of claim 11 in which the auxiliary tank is a highly thermally insulated vessel.

13. The apparatus of claim 11 having means for determining the rate of volume increase of the slush hydrogen in the fuel tank and means for controlling the rate of transfer of liquid hydrogen from the fuel tank to the auxiliary tank directly proportional to the rate of volume increase of slush hydrogen in the fuel tank and means for controlling the rate of transfer of slush hydrogen from the auxiliary tank to the fuel tank directly proportional to the rate of melt of volume increase of slush hydrogen in the fuel tank.

14. The apparatus of claim 11 wherein the rate of transfer of liquid hydrogen from the fuel tank to the auxiliary tank is about equal to the rate of volume increase of slush hydrogen in the fuel tank.

15. The apparatus of claim 11 wherein the rate of transfer of slush hydrogen from the auxiliary tank to the fuel tank is from about 0.85 to about 0.90 times the rate of volume increase of slush hydrogen in the fuel tank.

16. The apparatus of claim 11 wherein the auxiliary tank is a dewar having its lower region at least partially defined by an inclined bottom wall designed to urge solid components of the slush hydrogen to the lowest portion of the lower region thereof and wherein the means for transferring slush hydrogen from the auxiliary tank is in communication with such lowest portion and the means for transferring liquid hydrogen to the auxiliary tank is in communication with the upper region thereof at a point remote from the lowest portion of the lower region.

* * * * *